United States Patent Office 3,152,119
Patented Oct. 6, 1964

3,152,119
16-SUBSTITUTED-3,20-DIKETO PREGNENES
AND ESTERS THEREOF
Seymour Bernstein, New City, N.Y., and Joseph P. Joseph, Cliffside Park, N.J., assignors to American Cyanamid Company, New York, N.Y., a corporation of Maine
No Drawing. Filed Dec. 30, 1958, Ser. No. 783,672
15 Claims. (Cl. 260—239.5)

This invention relates to new steroid compounds. More particularly, it relates to 3,20-diketo pregnenes and pregnadienes and methods of preparing the same.

We have now found that the 16-methyl pregnenes and pregnadienes having the following structure have valuable diuretic properties. These compounds are useful in the treatment of cirrhosis of the liver, congestive heart failure, ascites, nephrotic and adrenogenital syndromes, emotional edema, eclampsia, and the like.

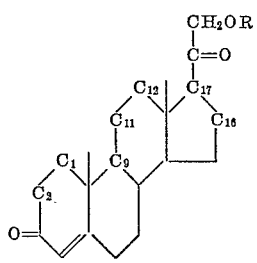

in which R is a member of the group consisting of hydrogen and lower alkanoyl radicals, —$C_1$—$C_2$— is a divalent radical of the group consisting of —$CH_2$—$CH_2$— and —CH=CH—, >$C_9$—$C_{11}$—$C_{12}$— is a trivalent radical of the group consisting of >C=CH—$CH_2$—,

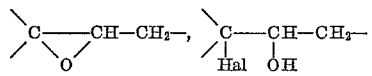

and

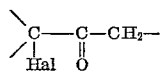

radicals and —$C_{16}$—$C_{17}$< is a trivalent radical of the group consisting of

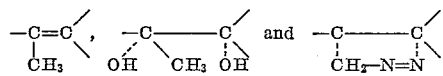

radicals.

The compounds of the present invention are prepared from 21-lower alkanoyloxy-4,9(11)16-pregnatriene-3,20-dione, the preparation of which is described hereinafter in the examples. The synthesis of the present compounds can be illustrated as follows:

FLOWSHEET

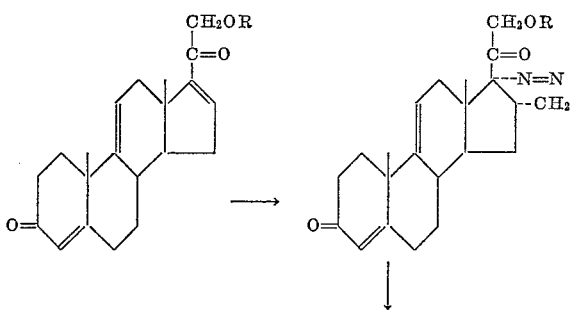

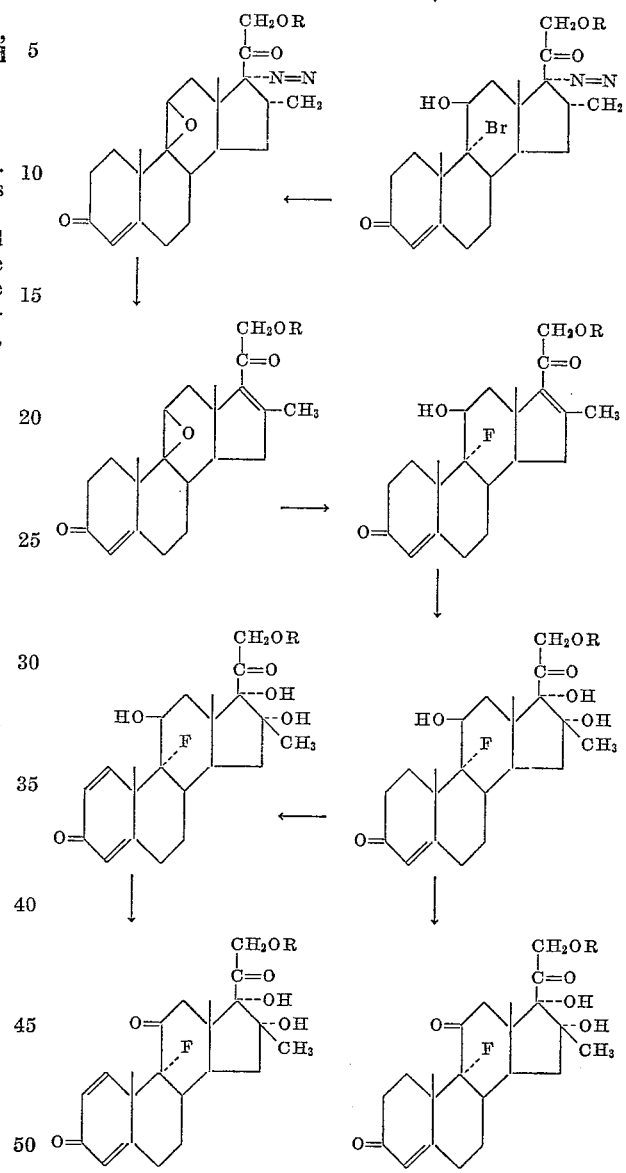

in which R is a lower alkanoyl radical. The radical R can be converted into hydrogen in any of the above formulae by hydrolysis under alkaline conditions.

The compounds of the present invention are soluble in organic solvents and substantially insoluble in water. They are, in general, crystalline solids and, in some instances, decomposed at the melting point.

The process for preparing the compounds of the present invention starts with a 21-lower alkanoyloxy-4,9(11),16-pregnatriene-3,20-dione, which is reacted with diazomethane in the presence of a solvent, for example, methylene chloride. This reaction takes place at room temperature over a period of from 2 to 24 hours. The 16α,17α-pyrazoline derivative of 21-lower alkanoyloxy-4,9(11),16-pregnatriene-3,20-dione is reacted with N-bromoacetamide in the presence of perchloric acid to produce the 16α,17α-pyrazoline derivative of 21-lower-alkanoyloxy-9α-bromo-11β-hydroxy-4,16 - pregnadiene - 3,20 - dione. The latter compound is heated in a lower fatty acid alcohol in the presence of potassium acetate for a period of from 30 minutes to 5 hours. The product obtained is the 16α,17α- pyrazoline derivative of 21 - lower alkanoyloxy - 9β,11β-oxido-4,16-pregnadiene-3,20-dione. The latter product is heated at a temperature of from 150–175° C. until the evolution of gas is complete. The product obtained is a 21-lower alkanoyloxy-16-methyl-9β,11β-oxido-4,16 - pregnadiene-3,20-dione. The latter product is then reacted with anhydrous hydrogen fluoride in the presence of a solvent such as tetrahydrofuran at a temperature below 0° C. for a period of from 30 minutes to 4 hours. The product 21-lower alkanoyloxy-9α-fluoro-11β-hydroxy-16-methyl-4,16-pregnadiene-3,20-dione is purified and recovered as a crystalline material. This product is then reacted with osmium tetroxide in the presence of a solvent such as benzene at room temperature for a period of a few minutes to several hours. Following crystallization, the product consisting of a 21-lower alkanoyloxy-9α-fluoro-11β,16α,17α-trihydroxy-16β-methyl-4-pregnene - 3,20 - dione is obtained. As previously pointed out, the 21-lower alkanoyloxy group can be converted into a hydroxyl group by hydrolysis under alkaline conditions.

The following examples illustrate in detail the preparation of the various pregnenes and pregnadienes of the present invention.

*Example 1*

PREPARATION OF 16α,17α-PYRAZOLINE DERIVATIVE OF 21-ACETOXY-4,9(11),16-PREGNATRIENE-3,20-DIONE

A mixture of 1.05 g. (0.0023 M.) of 3,(20-bisethylenedioxy-11-oxo-5-pregnene-17α,21-diol, 1.25 g. (0.033 M.) sodium borohydride, 40 ml. of tetrahydrofuran, 3.5 ml. of 5% sodium hydroxide solution, and 3.5 ml. of water is refluxed for 20 hours. With additional water, the mixture is refluxed for one-half hour more. The tetrahydrofuran is removed under reduced pressure, and the residual mixture is extracted with ethyl acetate. Evaporation under reduced pressure gives a glass which is dissolved in ether. Concentration gives a white powder; 653 mg., melting point 186–215° C. The mother liquor, on evaporation, gives about 380 mg. of a glass. Both fractions are combined and acetylated at room temperature with 3 ml. of acetic anhydride and 5 ml. of pyridine. In this manner there is obtained 979 mg. of 21-acetoxy-3,20-bis-ethylenedioxy-5-pregnene-11β,17α-diol, melting point 197–199° C.

One and one-half grams of the compound obtained above is dissolved in 30 ml. of dry pyridine, chilled to −5° C., and 6 ml. of thionyl chloride is added. The mixture is allowed to stand at −5° C. for 16 hours and then poured into ice water. The oily mixture is extracted with 2 liters of ether, the extract is washed with saturated saline solution, dried, and is evaporated under reduced pressure. The oily residue is crystallized from acetone-methanol, and the yield is 0.58 g. of 21-acetoxy-3,20-bis-ethylenedioxy - 5,9(11),16 - pregnatriene (42%), melting point 123–123.5° C.

The compound 21-acetoxy-3,20-bis - ethylenedioxy - 5,9(11),16-pregnatriene is dissolved in 300 ml. of glacial acetic acid by warming and 300 ml. of water is added hot. The solution is heated on the steam bath for one hour, cooled to near room temperature, and poured slowly into 9 liters of water, using vigorous stirring. The crystalline precipitate is filtered, washed well with water, and dried. Crystallization from acetone-petroleum ether gives 66.5 g. (89% yield) of 21-acetoxy-4,9(11),16-pregnatriene-3,20-dione, melting point 128–130° C.

In a separatory funnel cooled in an ice bath 10 g. of 50% potassium hydroxide and 15 ml. of methylene chloride is introduced. To this is added portionwise, 2.0 g. of N-methyl-N-nitroso - N′ - nitroguanidine. The resulting yellow solution is kept at 0–5° C. for 15 minutes, after which the lower potassium hydroxide layer is removed and the methylene chloride layer is dried over sodium hydroxide pellets for one-half hour. The methylene chloride solution is then decanted into a flask containing 200 mg. of 21-acetoxy-4,9(11),16-pregnatriene-3,20 - dione prepared as described above and allowed to remain overnight (19 hours), at room temperature. The excess diazomethane and methylene chloride are removed by passing in a stream of air and the yellow solid and gum which remains is crystallized from acetone-petroleum ether to give 146 mg. of product. From the filtrate there is obtained 25 mg., M.P. 164–166° C. dec. (gas), total yield 77%. Recrystallization from methanol of a sample did not alter the melting point;

$$\lambda_{max.}^{Ethanol} \ 237 - 238 \ m\mu \ (\epsilon \ 17,900)$$

*Example 2*

PREPARATION OF 16α,17α-PYRAZOLINE DERIVATIVE OF 21 - ACETOXY-9α-BROMO-11β-HYDROXY-4,16-PREGNADIENE-3,20-DIONE

In 5 ml. of peroxide-free dixoane and 1 ml. of water, 90 mg. of the 16α,17α-pyrazoline derivative of 21-acetoxy-4,9(11),16-pregnatriene-3,20-dione is dissolved and the solution is cooled to 15° C. There is added 42 mg. of N-bromoacetamide and 0.21 ml. of 10% perchloric acid and the solution is kept at 15° C. for 15 minutes, when it is quenched with 2 ml. of saturated aqueous sodium sulfite. The yellow solution is extracted with methylene chloride and washed with water, filtered, dried over magnesium sulfate and evaporated. The solid white residue weighs 110 mg. Recrystallization from acetone-hexane three times gives a product having a melting point to 172–174° C., $$\lambda_{max.}^{methanol} \ 242 \ m\mu \ (\epsilon \ 17,700)$$

*Example 3*

PREPARATION OF 16α,17α-PYRAZOLINE DERIVATIVE OF 21 - ACETOXY - 9β,11β-OXIDE-4,16-PREGNADIENE-3,20-DIONE

The crude 16α,17α-pyrazoline derivative of 21-acetoxy-9α-bromo-11β-hydroxy-4,16-pregnadiene-3,20 - dione (2.8 g.) is dissolved in 225 ml. of refluxing methanol and 6.0 g. of oven dried potassium acetate is added. The solution is refluxed for 3 hours, concentrated under reduced pressure and water added until a white solid separated. This is collected by filtration and dissolved in methylene chloride. The methylene chloride solution is passed through magnesol and concentrated under reduced pressure. The residue is crystallized from acetone-hexane leaving 1.0 g. of product. Two recrystallizations give a product with melting point 173–175° C. dec.

$$\lambda_{max.}^{ethanol} \ 242 \ m\mu \ (\epsilon \ 16,000); \ [\alpha]_D^{26} + 13° \ (0.5\% \ chloroform)$$

*Example 4*

PREPARATION OF 21-ACETOXY-16-METHYL-9β,11β-OXIDO-4,16-PRENADIENE-3,20-DIONE

Under a pressure of 0.5 mm., 200 mg. of the 16α,17α-pyrazoline derivative of 21-acetoxy-9β,11β - oxido - 4,16-pregnadiene-3,20-dione is heated in an oil bath to 160° C. When gas evolution is complete, the gummy residue is dissolved in methylene chloride, filtered through diatomaceous earth and evaporated to dryness leaving 119 mg. of a yellow oil;

$$\lambda_{max.}^{ethanol} \ 244 \ m\mu \ (\epsilon \ 21,500)$$

*Example 5*

PREPARATION OF 21-ACETOXY - 9α - FLUORO - 11β - HYDROXY-16-METHYL-4,16-PREGNADIENE-3,20-DIONE

In 12.6 ml. of methylene chloride 1.9 g. of crude 21-acetoxy-9β,11β-oxido-16-methyl-4,16-pregnadiene - 3,20 - dione is dissolved and cooled to −60° C. This is added to a cold (−60° C.) solution of 7.0 ml. of tetrahydrofuran, 2.5 ml. of methylene chloride and 3.5 ml. of anhydrous hydrogen fluoride and the red solution allowed to remain at −5° C. for three and one-half hours. After pouring the mixture into excess sodium bicarbonate solution, additional methylene chloride is added and the methylene chloride layer is separated, washed with water and dried over magnesium sulfate. On evaporation to dryness, there remained a glass which is added to a silica gel column. The product, 1.2 g. of crystalline material, is eluted with benzene-ether (1:2). Two recrystallizations gives a product having a melting point of 182–184° C.;

$\lambda_{max.}^{ethanol}$ 241 m$\mu$ ($\epsilon$23,000) $[\alpha]_D^{25}+119°$ (1% in chloroform).

Example 6

PREPARATION OF 21-ACETOXY-9$\alpha$-FLUORO-11$\beta$,16$\alpha$,17$\alpha$-TRIHYDROXY-16$\beta$-METHYL-4-PREGNENE-3,20-DIONE In 25 ml. of benzene and 0.22 ml. of pyridine 485 mg. of 21-acetoxy-9$\alpha$-fluoro-11$\beta$-hydroxy-16-methyl-4,16-pregnadiene-3,20-dione is added and the solution is stirred at room temperature when 322 mg. of osmium tetroxide is added. After 10 minutes a tan crystalline solid separated. The mixture diluted with ether and the product is collected by filtration. This material is dissolved in 40 ml. of absolute ethanol and a stream of hydrogen sulfide gas admitted. Immediately there separated a black precipitate which is removed by filtration and the ethanol filtrate is concentrated under reduced pressure at 20° C. There remained 288 mg. of a green gum. This is partitioned on a diatomaceous earth column (solvent system: cyclohexane, dioxane, water 5:4:1) to give a gum which crystallizes from ether. There is obtained 29 mg. of crystalline material which exhibits a positive reaction with blue tetrazolium.

$\lambda_{max.}^{methanol}$ 236–8 m$\mu$ ($\epsilon$16,300)

Two recrystallizations gives a melting point of 215–219° C.

Example 7

PREPARATION OF 9$\alpha$-FLUORO-11$\beta$,16$\alpha$,17$\alpha$,21-TETRAHYDROXY-16$\beta$-METHYL-4-PREGNENE-3,20-DIONE In 20 ml. of methanol 200 mg. of 21-acetoxy-9$\alpha$-fluoro-11$\beta$,16$\alpha$,17$\alpha$-trihydroxy-16$\beta$-methyl-4-pregnene-3,20-dione is dissolved and a solution of 0.3 g. of potassium carbonate in 24 ml. of 20% aqueous methanol was added. The resulting solution is allowed to remain overnight at room temperature under a nitrogen atmosphere.

The methanol is removed under reduced pressure at 30° C. and a solid separates from the aqueous solution. This is collected by filtration and recrystallized from acetone-petroleum ether.

Example 8

PREPARATION OF 9$\alpha$-FLUORO-11$\beta$,16$\alpha$,17$\alpha$,21-TETRAHYDROXY-16$\beta$-METHYL-1,4-PREGNADIENE-3,20-DIONE Hydrolysis of 21-acetoxy-9$\alpha$-fluoro-11$\beta$,16$\alpha$,17$\alpha$-trihydroxy-16$\beta$-methyl-1,4-pregnadiene-3,20-dione with aqueous potassium carbonate under nitrogen atmosphere as described hereinbefore affords 9$\alpha$-fluoro-11$\beta$,16$\alpha$,17$\alpha$,21-tetrahydroxy-16$\beta$-methyl-1,4-pregnadiene-3,20-dione as a white solid.

Example 9

PREPARATION OF 9$\alpha$-FLUORO-16$\alpha$,17$\alpha$,21-TRIHYDROXY-16$\beta$-METHYL-4-PREGNENE-3,11-20-TRIONE As previously described hydrolysis of 21-acetoxy-9$\alpha$-fluoro-16$\alpha$,17$\alpha$-dihydroxy-16$\beta$-methyl-4-pregnene-3,11,20-trione in aqueous potassium carbonate in a nitrogen atmosphere gives 9$\alpha$-fluoro-16$\alpha$,17$\alpha$,21-trihydroxy-16$\beta$-methyl-4-pregnene-3,11,20-trione.

Example 10

PREPARATION OF 21-ACETOXY-9$\alpha$-FLUORO-11$\beta$,16$\alpha$,17$\alpha$-TRIHYDROXY-16$\beta$-METHYL-1,4-PREGNADIENE-3,20-DIONE To a solution of 500 mg. of 21-acetoxy-9$\alpha$-fluoro-11$\beta$,16$\alpha$,17$\alpha$-trihydroxy-16$\beta$-methyl-4-pregnene-3,20-dione in 7.5 ml. of t-butanol and 2.5 ml. of acetic acid is added 250 mg. of selenium dioxide. The mixture is swept with nitrogen and refluxed for 24 hours. After cooling to room temperature, the solid material is removed by filtration and the filtrate is evaporated to dryness under reduced pressure. The residue is dissolved in methylene chloride and washed with cold dilute sodium hydroxide and then water until neutral. After drying over magnesium sulfate, an oil is obtained on evaporation under reduced pressure. This is acetylated during an overnight treatment in pyridine with acetic anhydride to give 21-acetoxy-9$\alpha$-fluoro-11$\beta$,16$\alpha$,17$\alpha$-trihydroxy-16$\beta$-methyl-1,4-pregnadiene-3,20-dione.

Example 11

PREPARATION OF 21-ACETOXY-9$\alpha$-FLUORO-16$\alpha$,17$\alpha$-DIHYDROXY-16$\beta$-METHYL-4-PREGNENE-3,11,20-TRIONE A solution of 21-acetoxy-9$\alpha$-fluoro-11$\beta$,16$\alpha$,17$\alpha$-trihydroxy-16$\beta$-methyl-4-pregnene-3,20-dione (250 mg.) in 6 ml. of pyridine is added to a mixture of 180 mg. of chromic anhydride in 2.5 ml. of pyridine. The solution is allowed to remain at room temperature for 18 hours and then is poured into water. A white solid precipitates, which is collected by filtration and washed with water. This solid is dissolved in methylene chloride, water washed and dried over magnesium sulfate. Evaporation to dryness under reduced pressure affords 21-acetoxy-9$\alpha$-fluoro-16$\alpha$,17$\alpha$-dihydroxy-16$\beta$-methyl-4-pregnene-3,11,20-trione which is crystallized from acetone-petroleum ether.

We claim:

1. A compound of the formula:

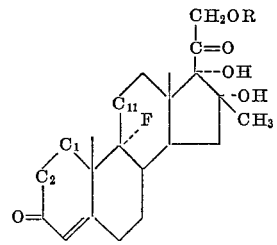

in which R is a member of the group consisting of hydrogen and lower alkanoyl, —$C_{11}$— is a member of the group consisting of

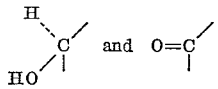

and —$C_1$—$C_2$— is a divalent radical of the group consisting of —$CH_2$—$CH_2$— and —CH=CH—.

2. A compound of the formula:

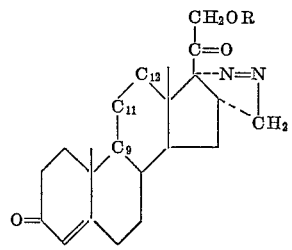

in which R is a member of the group consisting of hydrogen and lower alkanoyl and >$C_9$—$C_{11}$—$C_{12}$— is a trivalent radical of the group consisting of

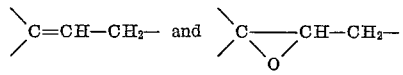

3. A compound of the formula:

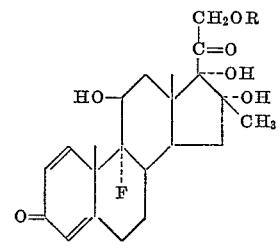

wherein R is selected from the group consisting of hydrogen and lower alkanoyl.

4. Compounds having the formula:

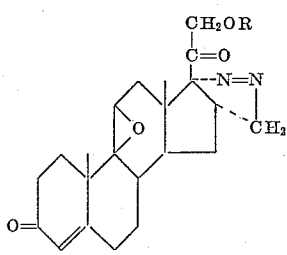

in which R is a lower alkanoyl radical.

5. The compound 16α,17α-pyrazoline derivative of 21-acetoxy-4,9(11),16-pregnatriene-3,20-dione.

6. The compound 16α,17α-pyrazoline derivative of 21-acetoxy-9β,11β-oxido-4,16-pregnadiene-3,20-dione.

7. The compound 21-acetoxy-16-methyl-9β,11β-oxido-4,16-pregnadiene-3,20-dione.

8. The compound 21-acetoxy-9α-fluoro-11β,16α,17α-trihydroxy-16β-methyl-4-pregnene-3,20-dione.

9. The compound 9α-fluoro-11β,16α,17α,21-tetrahydroxy-16β-methyl-4-pregnene-3,20-dione.

10. The compound 21-acetoxy-9α-fluoro-11β,16α,17α-trihydroxy-16β-methyl-1,4-pregnadiene-3,20-dione.

11. The compound 9α-fluoro-11β,16α,17α,21-tetrahydroxy-16β-methyl-1,4-pregnadiene-3,20-dione.

12. The compound 21-acetoxy-9α-fluoro-16α,17α-dihydroxy-16β-methyl-4-pregnene-3,11,20-trione.

13. The compound 9α-fluoro-16α,17α,21-trihydroxy-16β-methyl-4-pregnene-3,11,20-trione.

14. The compound 21-acetoxy-9α-fluoro-16α,17α-dihydroxy-16β-methyl-1,4-pregnadiene-3,11,20-trione.

15. The compound 9α-fluoro-16α,17α,21-trihydroxy-16β-methyl-1,4-pregnadiene-3,11,20-trione.

References Cited in the file of this patent
UNITED STATES PATENTS 2,831,003 Thomas _____ Apr. 15, 1958
2,852,511 Fried _____ Sept. 16, 1958

OTHER REFERENCES

Wettstein: Helv. Chim. Acta, vol. 27 (1944), pages 1803–1814.

Djerassi et al.: J. Org. Chem., vol. 14 (1949), pages 660–663.

Oliveto et al.: J. Am. Chem. Soc., vol. 80 (Aug. 20, 1958), page 4428.

Taub et al.: J. Am. Chem. Soc., vol. 80 (Aug. 20, 1958), page 4435.